United States Patent
Gomes et al.

(10) Patent No.: US 11,939,535 B2
(45) Date of Patent: Mar. 26, 2024

(54) SELECTIVE PROCESS AND CATALYSTS FOR THE PRODUCTION OF RENEWABLE FUELS AND DISTILLATES OF HIGH MOLECULAR WEIGHT

(71) Applicant: Petróleo Brasileiro S.A.—Petrobras, Rio de Janeiro (BR)

(72) Inventors: Jefferson Roberto Gomes, Rio de Janeiro (BR); José Luiz Zotin, Rio de Janeiro (BR); Anilza De Almeida Lyra Correa, Rio de Janeiro (BR); Marcelo Edral Pacheco, Rio de Janeiro (BR); Rodrigo Caetano Chistone, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/787,783

(22) PCT Filed: Dec. 15, 2020

(86) PCT No.: PCT/BR2020/050548
§ 371 (c)(1),
(2) Date: Jun. 21, 2022

(87) PCT Pub. No.: WO2021/119786
PCT Pub. Date: Jun. 24, 2021

(65) Prior Publication Data
US 2023/0047725 A1    Feb. 16, 2023

(30) Foreign Application Priority Data
Dec. 20, 2019    (BR) ........................ 10 2019 027610 0

(51) Int. Cl.
*C10G 3/00*    (2006.01)
*B01J 21/04*    (2006.01)
(Continued)

(52) U.S. Cl.
CPC ................ *C10G 3/46* (2013.01); *B01J 21/04* (2013.01); *B01J 21/066* (2013.01); *B01J 23/30* (2013.01);
(Continued)

(58) Field of Classification Search
CPC ... C10G 3/42; C10G 3/44; C10G 3/46; C10G 3/50; C10G 47/10; C10G 47/16;
(Continued)

(56) References Cited

U.S. PATENT DOCUMENTS 2,163,563 A    6/1939  Walther
3,700,585 A    10/1972 Chen et al.
(Continued)

FOREIGN PATENT DOCUMENTS

BR    PI0500591 A    10/2006
BR    PI0601403 A    12/2007
(Continued)

OTHER PUBLICATIONS

Da Rocha Filho et al. (Apr. 1993) "Formation of Alkanes, Alkylcycloalkanes and Alkylbenzenes during the Catalytic Hydrocracking of Vegetable Oils", Fuel, 72(4):543-549.

*Primary Examiner* — Brian A McCaig
(74) *Attorney, Agent, or Firm* — Mintz, Levin, Cohn, Ferris, Glovsky and Popeo, P.C.

(57) ABSTRACT

The present invention relates to a process for the conversion of plant oils, animal fats, waste food oils and carboxylic acids into renewable liquid fuels, such as bio-naphtha, bioQAV and renewable diesel, for use in combination with fossil fuels. The process is composed of two steps: hydrotreatment and hydrocracking. The effluent from the hydrotreatment step contains aromatics, olefins and compounds resulting from the polymerization of esters and acids. This is due to the use of partially reduced catalysts (Continued)

Figure 1:
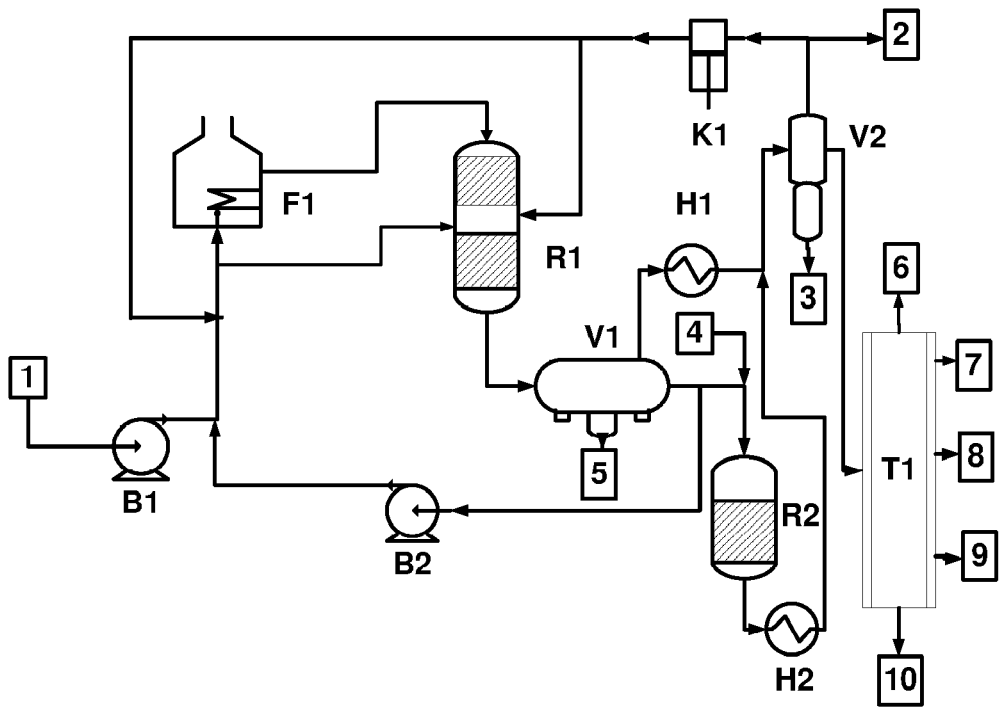

without the injection of a sulfiding agent and allows for the production of bioQAV of suitable quality for use in combination with fossil kerosene. Concurrently, the process generates, in addition to products in the distillation range of naphtha, kerosene and diesel, high molecular weight linear paraffins (up to 40 carbon atoms).

18 Claims, 1 Drawing Sheet

(51) Int. Cl.
| | |
|---|---|
| *B01J 21/06* | (2006.01) |
| *B01J 23/30* | (2006.01) |
| *B01J 23/85* | (2006.01) |
| *B01J 29/06* | (2006.01) |
| *B01J 37/02* | (2006.01) |
| *C10G 47/10* | (2006.01) |

(52) U.S. Cl.
CPC .............. *B01J 23/85* (2013.01); *B01J 29/06* (2013.01); *B01J 37/0201* (2013.01); *C10G 3/50* (2013.01); *C10G 47/10* (2013.01); *B01J 2229/26* (2013.01); *C10G 2300/1003* (2013.01); *C10G 2300/1011* (2013.01); *C10G 2400/02* (2013.01); *C10G 2400/04* (2013.01)

(58) Field of Classification Search
CPC .... C10G 2300/1003; C10G 2300/1011; C10G 2300/1037; C10G 2400/02; C10G 2400/04; B01J 21/04; B01J 21/066; B01J 23/28; B01J 23/30; B01J 23/85; B01J 29/06; B01J 29/166; B01J 29/7615; B01J 29/7815; B01J 29/7884; B01J 37/0009; B01J 37/0201; B01J 2229/20; B01J 2229/26; Y02P 30/20
See application file for complete search history.

(56) References Cited

U.S. PATENT DOCUMENTS

| | | | |
|---|---|---|---|
| 3,849,290 A | 11/1974 | Wise et al. | |
| 3,894,938 A | 7/1975 | Gorring et al. | |
| 3,950,241 A | 4/1976 | Bonacci et al. | |
| 4,032,431 A | 6/1977 | Weisz | |
| 4,141,859 A | 2/1979 | Plank et al. | |
| 4,176,050 A | 11/1979 | Chen et al. | |
| 4,181,598 A | 1/1980 | Gillespie et al. | |
| 4,222,855 A | 9/1980 | Pelrine et al. | |
| 4,229,282 A | 10/1980 | Peters et al. | |
| 4,247,388 A | 1/1981 | Banta et al. | |
| 4,419,220 A | 12/1983 | Lapierre et al. | |
| 4,518,485 A | 5/1985 | Lapierre et al. | |
| 4,827,076 A | 5/1989 | Kokayeff et al. | |
| 4,855,530 A | 8/1989 | LaPierre et al. | |
| 4,877,581 A | 10/1989 | Chen et al. | |
| 4,913,791 A | 4/1990 | Hurd et al. | |
| 4,992,605 A | 2/1991 | Craig et al. | |
| 5,233,109 A | 8/1993 | Chow | |
| 5,444,032 A | 8/1995 | Perego et al. | |
| 5,767,038 A | 6/1998 | Perego et al. | |
| 8,067,657 B2 | 11/2011 | Santiago et al. | |
| 8,314,274 B2 | 11/2012 | Marker et al. | |
| 8,366,910 B2 | 2/2013 | Gomes et al. | |
| 8,507,738 B2 | 8/2013 | Gomes et al. | |
| 8,742,183 B2 | 6/2014 | McCall et al. | |
| 2006/0186020 A1 | 8/2006 | Gomes | |
| 2007/0260102 A1* | 11/2007 | Duarte Santiago | C10G 45/00 585/733 |
| 2008/0154168 A1 | 6/2008 | Lutri | |
| 2010/0270207 A1 | 10/2010 | Gomes et al. | |
| 2018/0100106 A1* | 4/2018 | Zheng | C10G 1/002 |

FOREIGN PATENT DOCUMENTS

| | | |
|---|---|---|
| BR | PI0601460 A | 12/2007 |
| BR | PI0900789 A2 | 12/2010 |
| BR | PI0922234 A2 | 12/2015 |
| BR | 112012029964 A2 | 9/2016 |
| BR | 112013029901 B1 | 10/2019 |
| EP | 1857525 A1 | 11/2007 |
| FI | 933982 A | 9/1993 |
| FR | 3012467 A1 | 5/2015 |
| WO | 2007125332 A1 | 11/2007 |
| WO | 2010077476 A2 | 7/2010 |
| WO | 2011067634 A3 | 8/2011 |
| WO | 2012162403 A1 | 11/2011 |
| WO | 2011148046 A1 | 12/2011 |

* cited by examiner

SELECTIVE PROCESS AND CATALYSTS FOR THE PRODUCTION OF RENEWABLE FUELS AND DISTILLATES OF HIGH MOLECULAR WEIGHT

CROSS-REFERENCE TO RELATED APPLICATIONS

This application is a national phase application, filed under 35 U.S.C. § 371, of PCT International Patent Application No. PCT/BR2020/050548, filed Dec. 15, 2020, and claims benefit of and priority to Brazilian application BR 10 2019 027610 0, filed on Dec. 20, 2019, the disclosures of all of which are incorporated herein by reference in their entirety.

FIELD OF INVENTION

The present invention relates to a process for converting plant oils, animal fats, waste food oils and carboxylic acids into renewable liquid fuels, such as bio-naphtha, bioQAV and renewable diesel, for use in combination with fossil fuels, using partially reduced group VIB and group VIII metal oxide catalysts in a hydrogen atmosphere. More specifically, the described process produces a bioQAV stream with high yields and quality suitable, in terms of aromatic compound concentration, freezing point and plugging point, for incorporation into the kerosene pool. In parallel it generates, in addition to products in the distillation range of naphtha, kerosene and diesel, high molecular weight linear paraffins.

The present process presents potential for reducing investment and operating costs compared to conventional bioQAV production technologies. The use of partially reduced catalyst and the absence of sulfidizing agent injection in the process eliminates the need for amine treatment units to remove the generated $H_2S$. The gaseous product also presents low concentration of methane, $CO_2$ and carbon monoxide, also contributing to cost reduction, since carbon monoxide is responsible for the reduction of catalytic activity and the higher hydrogen consumption in the process.

DESCRIPTION OF THE STATE OF THE ART

Just as road transport presents a great dependence on the supply of diesel oil, due to the fleet of trucks and buses, air transport depends fundamentally on aviation kerosene (QAV). Therefore the search for alternative sources has driven many research routes and renewable sources have been of particular interest because they contribute to the improvement of the environment and can be an extra source of resources for countries rich in agricultural and forest resources.

Hydrogenation of plant oils and animal fats (triacylglycerides) combined with mineral oil is known from U.S. Pat. No. 2,163,563, which processes plant oils mixed with a stream of mineral oil in the presence of hydrogen at high pressure (50 to 500 atmospheres) and using a reduced Ni catalyst supported on alumina. The converted plant oil is separated by distillation and the mineral oil is recycled. However, this patent does not include hydroisomerization of the product to reduce the Fouling Point.

To convert plant oils directly into extra-quality diesel fuel, a hydrorefining technology was developed, based on already known technology, using existing commercial catalysts. The plant oils employed were: canola oil, soybean oil, and waste oil from cellulose production from pine trees (or any resinous plant). The oils used are of low quality, i.e., they have not undergone any treatment except filtration. The study resulted in the development of a new process for the hydrotreatment of pure plant oils to produce a hydrocarbon stream with high cetane number, according to G. N. da Rocha Filho, D. Brodzki and G. *Djéga-Mariadassou—Formation of alkylcycloalkanes and alkylbenzenes during the catalytic hydrocracking of plant oils, Fuel*, 72, pp. 543-549, 1993. Hydrocracking reactions are employed to reduce the number of carbon atoms in the chain, hydrotreating to remove oxygenated compounds, and hydrogenation of unsaturations to remove double bonds; commercial sulfide catalysts of NiMo and CoMo supported on alumina gamma were used for this purpose.

U.S. Pat. No. 4,992,605 uses the process of hydrorefining with sulfide catalyst (NiMo and CoMo), in presence of hydrogen (pressure from 4 to 15 MPa), temperature ranging from 350° C. to 450° C. and processes pure plant oils such as canola, sunflower, soybean, palm and wood oil that is a residue of the pulp production industry. The ultimate goal is to obtain a high cetane number stream to be added to the refinery's diesel pool, but the low temperature flow properties (e.g. pour point) are impaired. The yield of renewable diesel obtained is approximately 80% of the processed triacylglyceride load, with good results with respect to the useful life of the catalyst, but with expected regeneration of the catalyst throughout the campaign. The product obtained presents a cetane number varying from 55 to 90 with production of by-products: $C_1$ to $C_5$ gas, $CO_2$, CO and water. The liquid product is miscible in all proportions in the mineral diesel stream and can be added to the refinery's diesel pool, improving the cetane number, but impairing the low temperature cracking properties of the final product.

U.S. patent application Ser. No. 11/963,760 teaches a solution to the problem of reducing the partial pressure of $H_2$ in an HDT process, with two reactors in series, and intermediate separation of the gaseous products (CO, $CO_2$, $H_2O$, $H_2S$ and $NH_3$) generated in the first reactor. This process uses a load consisting of a mixture of triacylglycerides and petroleum hydrocarbons to produce a fuel containing less than 50 mg/kg of sulfur.

Application WO 2011/067634 A3 teaches the importance of using a diluent to control the reaction temperature and supply hydrogen adequately for the conversion of triacylglycerols.

U.S. Pat. No. 8,366,910 B2 describes a way to control excess energy resulting from the hydroconversion process by diluting the triacylglyceride load in hydrocarbon streams and using more than one load injection point along the catalytic bed.

U.S. Pat. No. 8,507,738 B2 teaches that it is possible to obtain high selectivity for generation of compounds with the same number of carbons in the chain of the converted triacylglyceride, minimizing the generation of gases during the hydroconversion process.

U.S. Pat. No. 8,067,657 B2 teaches that paraffins with boiling points in the kerosene range can be obtained by proper selection of the plant oils to be processed, but these are oils that have a high market value and are produced in small quantities.

In general, the renewable product from these processes contributes to improving the emissions presented by the diesel engine, and this improvement is inversely proportional to the quality of the base diesel fuel, that is, the worse the emission caused by the diesel, the better the response to the addition of the renewable paraffinic product generated, especially with regard to the reduction of NOx and CO emissions.

However this solution cannot be fully adopted for the production of renewable aviation kerosene (bioQAV), due to the specifications presented in ASTM D7566, mainly the properties that refer to the Freezing Point and the Distillation Curve.

For Freeze Point reduction patent U.S. Pat. No. 4,419,220 uses a catalyst containing beta zeolite impregnated with Pt and Pd for isomerization of n-paraffins C10+.

U.S. Pat. No. 4,518,485 uses ZSM-5 and ZSM-20 zeolites impregnated with VIB and VIIIB group metals for the reduction of the Fouling Point of a diesel stream.

A process scheme is presented in U.S. Pat. No. 4,913,791, where the diesel stream is treated in a first catalytic bed containing NiMo or CoMo sulfide-based catalysts and a second bed containing hydroisomerization catalyst (beta zeolite).

A catalyst containing SAPO-11 is used in U.S. Pat. No. 4,877,581 for reducing the freezing point of a lubricant chain.

A mixture of n-paraffins, similar to the product obtained in plant oil processing, was used, in U.S. Pat. No. 4,855,530 as a filler for hydroisomerization reactions, with a catalyst containing ZSM-12, ZSM-20 and ZSM-50.

Catalysts with dual function, i.e. impurity removal and isomerization, made with non-crystalline molecular sieves SAPO and AIPO$_4$, were employed in U.S. Pat. No. 4,827,076.

A series of hydroisomerization experiments employing n-paraffin C16 loading was performed with catalysts based on $SiO_2/Al_2O_3$ and group VIIIB metals (U.S. Pat. Nos. 5,444,032, 5,767,038).

Therefore, catalysts containing molecular sieves, zeolitic or not, impregnated with reduced VIIIB group metal (Pt, Pd, etc.) and with high activity for hydroisomerization reactions and low activity for hydrocracking reactions, have been employed for both lubricant and diesel oil production.

However, in the case of paraffins obtained from the hydroconversion of triacylglycerides, the generated compounds have chains with 15 to 20 atoms of carbon15 (with most containing chains in the range of 17 to 18 carbon atoms), while the most suitable compounds for aviation kerosene with respect to their boiling temperature are those found in the range between 9 to 14 carbon atoms. Therefore selective cracking processes are required for chain size reduction and bioQAV production.

U.S. Pat. No. 5,233,109 describes a synthetic petroleum produced by catalytic cracking of biomass, such as plant or animal oil, in the presence of a catalyst that is alumina, with or without silica, and/or a zeolitic and/or rare earth component. The reaction is carried out in the presence of a carrier gas that can be air, nitrogen, argon, hydrogen, and a hydrocarbon obtained from oil refining, with the objective of obtaining renewable current in the boiling range of gasoline.

Selective conversion of normal paraffins generally involves the employment of zeolites with a pore size that allows only linear and/or weakly branched paraffins to enter, excluding polyramified, cyclic, and aromatic compounds. The use of catalysts containing zeolites ZSM-5, ZSM-11, ZSM-12, ZSM-23, ZSM-35, etc.; is cited in U.S. Pat. Nos. 3,700,585; 3,894,938; 4,176,050; 4,181,598; 4,222,855; 4,229,282; 4,247,388; 3,849,290; 3,950,241; 4,032,431 and 4,141,859, but these materials are very acidic and are more selective for cracking reactions than for isomerization reactions.

Patent PI 933982 presents a process for the production of renewable diesel through the conversion of triacylglycerides chain. In a first stage, with the presence of hydrogen and alumina catalysts impregnated with NiMo or CoMo oxides, in the form of sulfides, the removal of oxygen atoms and saturation of olefins occurs, so the product is composed almost entirely of normal paraffins with 15 to 18 carbon atoms. In a second stage isomerization of the effluent stream from the first stage occurs, with catalysts containing SAPO-11 and ZSM-22 screens impregnated with Pt.

U.S. Pat. No. 8,314,274 B2 proposes the load conversion of triacylglycerides in two steps, wherein the first step occurs the hydrotreatment process, wherein a triacylglyceride stream diluted with a product recycle stream, in a fixed catalytic bed composed of alumina impregnated with NiMo and CoMo sulfides. In the second step, after separation of the products from the first step, the generated paraffin stream is converted into a selective catalyst bed for hydroisomerization. It is noteworthy that, under higher operating temperature conditions, cracking of the product occurs and the yield of renewable diesel is reduced, with the generation of components in the boiling range of bioQAV (PIE:150° C. and PFE 300° C.) and naphtha, so there is no production of streams with boiling point higher than that of the QAV.

To increase the generation of bioQAV the U.S. Pat. No. 8,742,183 B2 proposes the addition of one more stage, following the hydrotreating and hydroisomerization steps, to promote the cracking of the formed isomers, through catalysts with more acidic supports, such as ZSM-5, zeolite Y and MOR. The liquid product from the hydrogenation and dehydrogenation stage is composed of n-paraffins containing mostly 15 to 18 carbon atoms, and may contain small amounts of heavier paraffins, up to 24 carbon atoms, depending on the type of load employed. This carbon number range is quite suitable, in terms of boiling point, to be added as a component of the diesel oil pool, provided that low-temperature flow properties (Fouling Point) can be improved, which can be obtained by the mild hydroisomerization process, as it is enough to create few branches in the chain to provide large reduction of the Fouling Point. But for the production of aviation kerosene, the low temperature flow specifications are more severe and the most suitable range of carbons is 9 to 16 atoms, demonstrating the need to selectively hydrocrack the stream in order to produce less naphtha, which is a lower value byproduct.

The present invention differs substantially from the one described above in that it presents a process comprising two steps: hydrotreating (hydrodeoxygenation and polymerization) and hydrocracking. Differently from existing technologies, the effluent from the hydrotreating stage presents aromatics and some olefins in its composition. This fact occurs due to the use of partially reduced catalysts and without injection of sulfidizing agent and allows obtaining a bioQAV with quality suitable for use in mixture with fossil kerosene. In parallel, the process generates, in addition to products in the distillation range of naphtha, kerosene and diesel, linear paraffins of high molecular weight (with up to 40 carbon atoms).

SUMMARY OF THE INVENTION

Broadly, the present invention aims to enable a process and a catalytic system for producing renewable liquid fuels from plant oils, animal fats and carboxylic acids. The proposed catalytic system uses partially reduced group VIB and group VIII metal oxide catalysts.

More specifically, the described process produces a bioQAV stream with high yields and suitable quality, in terms of aromatic compound concentration, freezing point and fouling point, for incorporation into the kerosene pool. In parallel it generates, in addition to products in the distillation range of naphtha, kerosene and diesel, high molecular weight linear paraffins.

BRIEF DESCRIPTION OF THE DESIGNS

Figure 2:
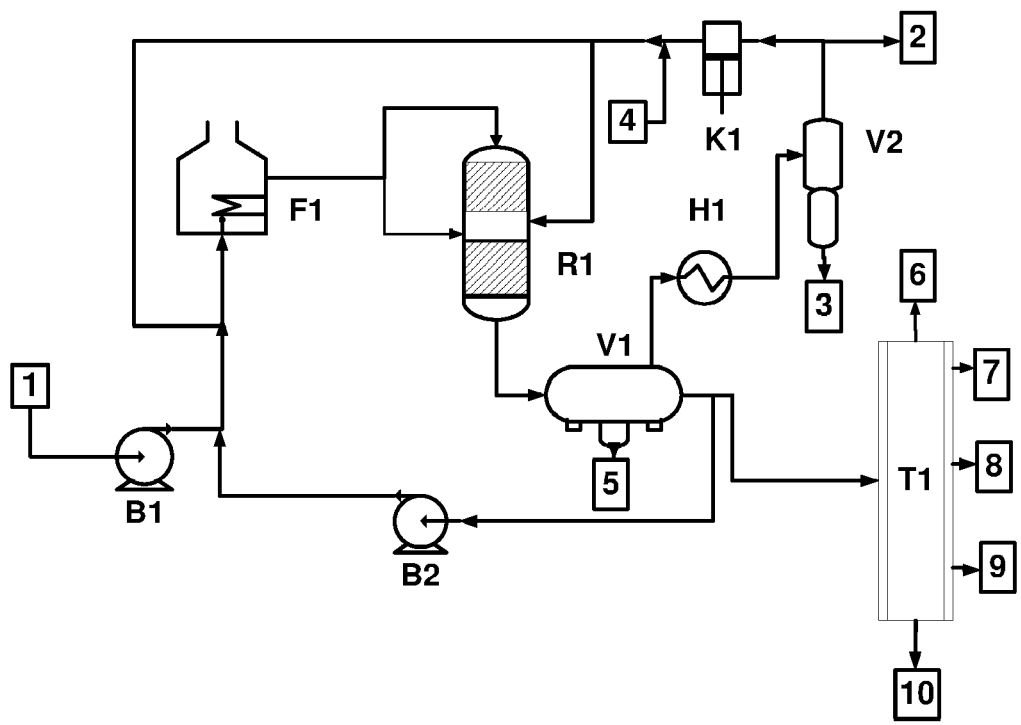

FIGS. 1 and 2 show two possible schemes for process of the present invention without, however, limiting it to these two configurations.

In FIG. 1 the process load (1) is pumped by pump B1 and mixed with recycle coming from pump B2. The load is mixed with hydrogen coming from the recycle compressor K1. Part of the load can be injected into between the catalytic beds of the R1 reactor and the rest is heated in the heat exchanger batteries and the F1 furnace and fed to the reactor inlet. The R1 reactor is divided into several beds of Type 1 catalyst. The product from the R1 reactor is sent to the V1 separator vessel where the various phases are separated. The aqueous phase (5), rich in $CO_2$ can be directed to refinery process water; the gaseous phase, composed of light hydrocarbons, with a mid boiling point of gasoline and unreacted hydrogen, is cooled and mixed with 0 cooled effluent from reactor R2. Part of the liquid hydrocarbon stream from V1 is mixed with replacement hydrogen (4) and fed into reactor R2. Most of the stream is pumped through pump B2 to make up the dilution stream of the unit load stream. The R2 reactor, composed of one or more beds of type 2 catalysts, is responsible for the generation of lower boiling point products. The effluent from reactor R2 is cooled, mixed with the separated gas stream from V1, and sent to the V2 phase separator. In the V2 separator, the $H_2$-rich gaseous stream is recycled to the R1 reactor and the hydrocarbon stream (3) is routed to the T 1 distillation tower, where a light stream (6), rich in C3 and C4 olefins; a stream in the gasoline distillation range (7), rich in isomers and olefins; a stream (8) in the bioQAV distillation range and the stream (9) in the diesel distillation range are separated. The stream (10) heavier than diesel, can be recycled to the R2 reactor to be converted or processed into HCC units.

The process scheme in FIG. 2 is a simplification of the process shown in FIG. 1, where the reactor R2 was eliminated and the type 2 catalyst was incorporated into reactor R1 along with type 1 catalyst.

DESCRIPTION OF THE INVENTION

Despite the developments in the technology, there is still a need in the technique for a process for the hydroconversion of triaacylglycerides with high yield of renewable aviation kerosene, with lower hydrogen consumption and better quality of the by-products (naphtha and liquefied gas).

Broadly speaking, the process of this invention for the hydroconversion of plant oils comprises multiple catalytic stages, including hydrotreatment reactions (hydrodeoxygenation and polymerization) and selective hydrocracking.

In the first process stage, a load comprising triacylglycerides in the proportion between 1 and 75% by mass and hydrocarbons in the proportion between 99 and 25% by mass is hydrotreated. The hydrocarbon stream may or may not come from product recycle. It must be emphasized that the load cannot contain any sulfur compounds (H2S, DMDS, etc.). The composite load, after the injection of a hydrogen current, is directed to the reactor where the hydrodeoxygenation reactions take place, in the presence of a partially reduced catalyst and without the addition of sulfur compounds. The hydrotreating conditions are: operating pressure from 4 MPa to 10 MPa, average catalytic bed temperature ranging from 320° C. to 400° C., space velocity from 0.5 $h^{-1}$ to 2 $h^{-1}$ and hydrogen:load ratio ranging from 200 Nl of hydrogen/liter of load to 1000 Nl of hydrogen/liter of load.

In general, the conventional HDT process includes passing a hydrocarbon stream with a hydrogen stream in a fixed catalytic bed reactor, under pressure conditions between 1 and 15 MPa, and average temperature between 280° C. and 400° C. Since these are exothermic reactions and the reactor operates adiabatically, there is a temperature increase along the catalytic bed. However, the process imposes limits to the temperature increase, usually to 40° C. per catalyst bed, to minimize the deactivation of the catalyst and ensure a minimum campaign time of 1 to 2 years. When the heat of reaction is very high and the temperature rise is excessive, the reactor can be designed with more than one catalyst bed and a recycle gas stream can be injected to cool the bed and additionally replace the hydrogen consumed in the reactions. In the case of more than one catalytic bed, the exothermicity is higher in the first bed, due to the presence of more reactive constituents and the higher concentration of reactants and, consequently, the higher reaction rate; thus, the more refractory regents continue to react at a lower reaction rate along the subsequent catalytic beds in the reactor.

Therefore, a relevant factor in the conventional HDT process of oil refining streams is the high exothermicity of the triglyceride hydroconversion reactions and the generation of $H_2O$, CO and $CO_2$ gases by decarboxylation/decarbonization reactions of the constituent fatty acids. In the present invention, due to the low hydrogenation activity of the catalyst, there is no generation of CO which is produced by incomplete hydrogenation of $CO_2$.

In the first step of the invention, only metal oxide catalysts, mainly from groups VIB and VI II B in the periodic table, were used, deposited on various supports of high specific area but low acidity, which are active for deoxygenation and polymerization reactions of esters and acids, but with low activity for saturation of olefinic compounds. It is emphasized that the load, unlike the other processes, should not contain sulfur compounds that have a negative effect on the selectivity of the catalysts.

The catalysts were reduced under mild conditions so as to keep much of the metal in the oxidized form. The goal is to obtain the conversion of fatty acids and esters into saturated and unsaturated paraffins, preserving the olefinic compounds present in plant oils and fats. The oxygen atoms are converted into water and $CO_2$, with low generation of CO and $CH_4$, which contributes to reduce the molar mass of the gas stream coming from the process. These effects contribute to the reduction of hydrogen consumption and energy consumption of compressors, since the process recycle gas has lower molecular weight. It is also important to highlight that, due to the absence of $H_2S$ in the reaction medium, the gaseous and light streams produced can be easily incorporated into the load of other existing process units in an oil refinery (steam reforming for hydrogen production, fluid catalytic cracking (FCC), etc.).

In the second stage of the process, catalysts composed of metal oxides of groups VIB and VIIIB, deposited on supports with acidic properties, and active for hydrocracking reactions are employed, maintaining the same operating conditions as in the first stage.

To better take advantage of the catalyst characteristics, two preferred, but not limited to, process schemes are proposed where two types of catalysts are used, as described below:

Type 1 catalyst, active for hydrodeoxygenation and polymerization reactions, with formation of hydrocarbons with carbon chains larger than those present in the load, composed of metallic oxides of the VIB group, mainly Mo and W, supported on materials with high specific area and high porosity, being one of the most used materials the γ-alumina (γ-$Al_2O_3$) with specific area between 200 and 400 $m^2/g$ and pore volume of 0.5 to 1.0 $cm^3/g$. Besides providing high specific area, in which the active components are dispersed in the form of small particles, the support provides mechanical strength and thermal stability preventing sintering of the catalyst inside the reactor.

Type 2 catalyst, composed of metal oxides of the VIB and VI II B groups (preferably Ni), are usually bimetallic in the form of metal oxides (Ni—Mo, Co—Mo, Co—W and Ni—W) deposited on a support with acidic properties and active for hydrocracking reactions, such as zeolite-type molecular sieves, preferably zeolite Beta, ZSM-22, zeolite Y, etc.

The Type 1 catalyst promotes the removal of oxygen atoms, preserves the insatuations present in the load and catalyzes polymerization reactions, which results in products with molecules containing a greater number of carbon atoms than the carboxylic acids present in the load. However, to increase the current yield with bioQAV boiling point (Boiling End Point (BoP)=300° C.), the effluent from the first reaction stage can be forwarded to a second reaction stage.

The second reaction stage uses type 2 catalyst to provide catalytic cracking of the effluent from the first stage and increase the yield of lower boiling point products, but preserving the unsaturated products that confer important properties for increasing the value of light chains, i.e., increased naphtha octane rating, generation of propene and petrochemical butenes.

Between the first and second stages there may optionally be a separation of the gaseous products, with the objective of recovering the light olefinic products (of greater commercial value) and the water generated, cracking only the heavier stream.

FIGS. 1 and 2 show two possible schemes for process of the present invention without, however, limiting it to these two configurations. In FIG. 1 the process load (1), composed of carboxylic acids, esters (triacylglycerides) of plant oils and animal fats, etc.; is pumped by pump B1 and mixed with the recycle coming from pump B2. The purpose of the recycle current is to reduce the temperature of the R1 reactor due to the exothermicity of the reaction. The volumetric dilution ratio is 2 to 10 (diluent to load), preferably 3 to 6. The composite load is mixed with hydrogen from the recycle compressor K1. The ratio of hydrogen to combined load flow rate is 200 to 800 $Nm^3/m^3$, preferably 300 to 500 $NM^3/m^3$. Part of the load can be injected into between the catalytic beds of the R1 reactor and the rest is heated in the heat exchanger batteries and the F1 furnace and fed to the reactor inlet. The R1 reactor is divided into several catalytic beds and, in order to control the reactor outlet temperature, hydrogen and/or liquid streams are injected between beds. The average temperature of the R1 reactor ranges from 300 to 400° C., preferably 320 to 360° C. The product from the R1 reactor is sent to the separator vessel V1 where the various phases are separated. The aqueous phase (5), rich in $CO_2$ can be directed to refinery process water; the gaseous phase, composed of light hydrocarbons, with a boiling point average of gasoline and unreacted hydrogen, is cooled and mixed with the cooled effluent from the R2 reactor. Part of the liquid hydrocarbon stream from V1 is mixed with replacement hydrogen (4) and fed into reactor R2 with most of the stream being pumped by pump B2 to make up the unit load dilution stream. The R2 reactor, composed of one or more beds of type 2 catalysts, is responsible for generating lower boiling point products. The effluent from reactor R2 is cooled, mixed with the separated gas stream from V1 and sent to the V2 phase separator. In the V2 separator, the $H_2$-rich gaseous stream is recycled to the R1 reactor and the hydrocarbon stream (3) is routed to the T1 distillation tower, where the lighter stream (6), rich in C3 and C4 olefins, can be routed to the FCC unit's gas recovery unit, or marketed directly. Stream (7) is composed of gasoline rich in isomers and olefins. Stream (8) has the distillation range of bioQAV but the olefinic compounds must be previously hydrogenated in a dedicated unit or in a fossil QAV HDT unit through co-processing or alternate campaigns. Stream (9) is composed of renewable diesel that can be added directly to the diesel pool. The stream (10) heavier than diesel, can be recycled to the R2 reactor to be converted or processed into HCC units.

The process scheme in FIG. 2 is a simplification of the process shown in FIG. 1 in order to reduce the investment cost. In the scheme of FIG. 2, reactor R2 was eliminated and type 2 catalyst was incorporated into reactor R1 along with type 1 catalyst.

EXAMPLES

In the tests performed to evaluate the catalytic activity, a reactor with a volume of 5 $cm^3$ was used, operating isothermally. The liquid product was cooled and analyzed by gas chromatography coupled with mass spectrometry detector (GC-MS) for identification of the compounds. Capillary column model AC210173.038 of 40.0 m×100 um×0.20 um was employed. The distillation curve of the product was determined from the boiling point of the normal paraffins in a manner similar to the methodology employed in ASTM 2887 for determining the simulated distillation curve. The distillation curve points ASTM D86, as required by the norm ASTM 7566, was estimated from the simulated distillation curve obtained and converted using the correlations presented in "Analytical Correlations Interconvert Distillation Curve Types", Oil & Gas Journal, vol. 84, 1986, August 25, pp 50-57. The product gas was collected, quantified and analyzed by gas chromatography using the standard method for refinery gas analysis.

Example 1

Test with CAT1 (Type 1) prepared by impregnating ammonium heptamolybdate, by the wet-spot technique, into 1.3 mm diameter cylindrical extrudates of alumina gamma and containing a nominal 20% m $MoO_3$ content. The material was dried at 120° C. for approximately 16 hours and calcined for 3 hours at 550° C. Under these conditions the molybdenum is preferentially in the oxidation state (+6), in the form of molybdenum trioxide or equivalent structures.

a. The reactor was loaded only with a CAT1 catalyst bed (Type 1) and had the temperature raised to 400° C., with hydrogen flow, for partial reduction of the metal oxide. According to the temperature-programmed reduction (TPR) characterization analysis, a partially reduced molybdenum oxide-based catalyst with a reduction degree between 1 and 90%, preferably between 5 and 50%, is obtained under this condition. After the catalyst reduction step, the reaction temperature is adjusted to the test condition and the load injection is started.

b. Two different fillers were employed, one composed of 75% m n-heptane and 25% m refined soybean oil (Tests 1 to 3) and another composed of 75% n-heptane and oleic acid (Test 4). The results of the tests are presented in Table 1.

TABLE 1

|  |  | Teste 1 | Teste 2 | Teste 3 | Teste 4 |
|---|---|---|---|---|---|
| Load |  | 25% OS + 75% C7 | 25% OS + 75% C7 | 25% OS + 75% C7 | 25% AC + 75% C7 |
| Pressure | MPa | 60 | 60 | 60 | 30 |
| Temp. | ° C. | 340 | 350 | 360 | 330 |
| H$_2$ load | Nm$^3$/m3 | 600 | 600 | 600 | 600 |
| WHSV | h*$^1$ | 1.5 | 1.5 | 1.5 | 1.5 |
| % weight |  |  |  |  |  |
| CO2 |  | 1.1 | 1.2 | 1.3 | 0 |
| C1 |  | 0.1 | 1.2 | 1.3 | 0 |
| C2= |  | 0.1 | 0.0 | 0.0 | 0 |
| C2 |  | 0.3 | 0.3 | 0.5 | 0 |
| C3= |  | 1.9 | 1.3 | 1.0 | 0 |
| C3 |  | 2.7 | 3.0 | 4.0 | 0 |
| C4= |  | 0.1 | 0.1 | 0.1 | 0 |
| IC4 |  | 0.0 | 0.0 | 0.0 | 0 |
| C4 |  | 0.2 | 0.2 | 0.4 | 0 |
| C5= |  | 0.1 | 0.1 | 0.2 | 0 |
| IC5 |  | 0.0 | 0.0 | 0.0 | 0 |
| C5 |  | 0.2 | 0.3 | 0.4 | 0 |
| CO |  | 0.0 | 0.0 | 0.0 | 0 |
| C6 |  | 0.2 | 0.2 | 0.4 | 0 |
| H2O |  | 11.3 | 11.2 | 11.1 | 12.8 |
| % QAV | 150-300 | 16.3 | 17.5 | 20.1 | 17.4 |
| % diesel | 300-350 | 42.0 | 41.0 | 37.3 | 17.4 |
| % light oil | 350-450 | 9.3 | 11.7 | 14.4 | 17.4 |
| % heavy oil | 450+ | 14.0 | 11.7 | 8.6 | 34.9 |
| % Olefins QAV |  | 74.7 | 64.7 | 59.0 | 71.3 |
| % Nparaffin QAV |  | 25.3 | 35.3 | 41.0 | 28.7 |
| % Olefins Diesel |  | 59.4 | 49.2 | 45.0 | 74.9 |
| % N paraffin Diesel |  | 41.1 | 51.4 | 55.7 | 26.1 |
| % Olefins light oil |  | 84.2 | 78.1 | 78.4 | 71 |
| % N paraffin light oil |  | 15.8 | 21.9 | 21.6 | 29 |

An important aspect to be highlighted in the data presented in Table 1 is the formation of a heavy oil fraction, not observed when sulfide catalysts are employed, where paraffins C15 to C18 predominate when having a soybean oil load, which have boiling points below 350° C., as reported in the patents analyzed.

The analysis of Table 1 shows that with increasing temperature, the bioQAV yield increases and the residue generation is reduced. It is also important to highlight the high amount of olefinic compounds in all fractions. The absence of CO is important because this compound represents a problem for purification of the recycle gas and decreases the catalytic activity.

The composition of the liquid product was obtained by two-dimensional chromatographic analysis and is shown in Table 2.

TABLE 2

| saturated | 71.9 |
|---|---|
| Olefins | 22.5 |
| Mono-aromatics | 5.2 |
| Di-aromatics | 0.4 |
| Poly-aromatics | 0 |
| Aromatics | 5.6 |

The analysis of Table 2 shows an important generation of aromatics as products of hydrodeoxygenation of plant oils and fatty acids, a relevant aspect of the present innovation. The production of renewable aviation kerosene containing aromatic compounds in its composition is of interest to the refining industry since the ASTM D1655 standard establishes minimum contents of these compounds due to the compatibility of the fuel with components and elastomers present in aircraft engines and turbines.

Example 2

Test with CAT2 (Type 1) prepared by impregnating ammonium heptamolybdate by the wet-spot technique into 1.3 mm diameter cylindrical extrudates of titanium oxide and containing a nominal 20% m MoO$_3$ content. The material was dried at 120° C. for approximately 16 hours and calcined for 3 hours at 550° C. Under these conditions molybdenum is preferentially in the oxidation state (+6), in the form of molybdenum trioxide or equivalent structures.

The reactor was loaded with CAT2 catalyst (Type 1) and had the temperature raised to 400° C., with hydrogen flow, for partial reduction of the metal oxide. According to the temperature-programmed reduction (TPR) characterization analysis, a partially reduced molybdenum oxide-based catalyst with a reduction degree between 1 and 90%, preferably between 5 and 50%, is obtained under this condition. After the catalyst reduction step, the reaction temperature is adjusted to the test condition and the load injection is started.

A loading composed of 75% m n-heptane and 25% m soybean oil was employed. The results of the tests are presented in Table 3.

TABLE 3

|  |  | T2 | T3 | T4 | T5 |
|---|---|---|---|---|---|
| Pressure | MPa | 60 | 60 | 60 | 60 |
| Temp. | ° C. | 320 | 340 | 350 | 360 |
| H2load | Nm$^3$/m$^3$ | 600 | 600 | 600 | 600 |
| WHSV | h$^{-1}$ | 1.5 | 1.5 | 1.5 | 1.5 |
| % weight |  |  |  |  |  |
| CO2 |  | 3.0 | 2.7 | 2.3 | 1.7 |
| C1 |  | 0.0 | 0.1 | 0.1 | 0.2 |
| C2= |  | 0.0 | 0.0 | 0.0 | 0.0 |
| C2 |  | 0.1 | 0.2 | 0.2 | 0.3 |
| C3= |  | 1.7 | 1.2 | 0.8 | 0.5 |
| C3 |  | 1.7 | 2.5 | 3.2 | 3.7 |
| C4= |  | 0.0 | 0.1 | 0.1 | 0.1 |
| IC4 |  | 0.0 | 0.0 | 0.0 | 0.1 |
| C4 |  | 0.0 | 0.1 | 0.2 | 0.3 |
| C5= |  | 0.0 | 0.1 | 0.1 | 0.1 |
| IC5 |  | 0.0 | 0.0 | 0.0 | 0.0 |
| C5 |  | 0.0 | 0.1 | 0.2 | 0.3 |
| CO |  | 0.0 | 0.0 | 0.0 | 0.0 |
| C6 |  | 0.1 | 0.1 | 0.1 | 0.2 |
| H2O |  | 9.8 | 10.0 | 10.3 | 10.8 |
| % QAV | 150-300 | 7.3 | 11.3 | 11.2 | 17.0 |
| % diesel | 300-350 | 14.5 | 22.6 | 22.5 | 23.8 |
| % light oil | 350-450 | 3.6 | 7.5 | 11.2 | 10.2 |
| % heavy oil | 450+ | 58.2 | 41.4 | 37.5 | 30.6 |
| % Olefins QAV |  | 80.0 | 72.0 | 64.3 | 62.0 |

TABLE 3-continued

|  | T2 | T3 | T4 | T5 |
| --- | --- | --- | --- | --- |
| % Nparaffin QAV | 20.0 | 28.0 | 35.7 | 38.0 |
| % Olefins diesel | 62.3 | 46.0 | 43.6 | 42.3 |
| % Nparaffin diesel | 38.1 | 55.9 | 58.4 | 59.7 |
| % Olefins light oil | 87.9 | 77.8 | 77.0 | 75.5 |
| % Nparaffin light oil | 12.1 | 22.2 | 23.0 | 24.5 |

Comparing the results of Table 3 with those of Table 1 it can be seen that CAT1 is more selective for bioQAV production than CAT2, the latter being more selective for the generation of heavy oils and for the generation of products with higher olefin contents. However, both catalysts did not present CO production. CAT2 showed higher CO generation, which, combined with 0 higher olefin content, results in lower hydrogen consumption.

The composition of the liquid effluent was obtained by two-dimensional chromatographic analysis and is presented in Table 4.

TABLE 4

|  | % m |
| --- | --- |
| Saturated | 46.2 |
| Olefins | 48.1 |
| Monoaromatics | 5.71 |
| Diaromatics |  |
| Polyaromatics |  |
| Aromatics total | 5.71 |

Comparing the results in Table 4 with those in Table 2 shows that the aromatics content is similar, but CAT2 is more selective for olefin generation than CAT1.

Example 3

Test with CAT3 (Type 1) prepared by impregnating ammonium heptamolybdate by the wet-spot technique into 1.3 mm diameter cylindrical extrudates of zirconium oxide and containing a nominal 20% m $MoO_3$ content. The material was dried at 120° C. for approximately 16 hours and calcined for 3 hours at 550° C. Under these conditions the molybdenum is preferentially in the oxidation state (+6), in the form of molybdenum trioxide or equivalent structures.

The reactor was loaded with the CAT3 catalyst and had the temperature raised to 400° C., with hydrogen flow, for partial reduction of the metal oxide. According to the temperature programmed reduction (TPR) characterization analysis, a partially reduced molybdenum oxide based catalyst with a reduction degree between 1 and 90%, preferably between 5 and 50%, is obtained at this condition. After the temperature was reduced to the test condition, the load was injected.

A loading composed of 75% m n-heptane and 25% m soybean oil was used. The results of the tests are shown in Table 5.

TABLE 5

|  |  | T2 | T3 | T4 | T5 | T6 |
| --- | --- | --- | --- | --- | --- | --- |
| Pressure | MPa | 60 | 60 | 60 | 60 | 60 |
| Temp. | ° C. | 320 | 340 | 350 | 330 | 360 |
| H2 load | $Nm^3/m^3$ | 600 | 600 | 600 | 600 | 600 |
| LHSV | $h^{-1}$ | 1.5 | 1.5 | 1.5 | 1.5 | 1.5 |
| % weight |  |  |  |  |  |  |
| CO2 |  | 0.4 | 0.4 | 0.3 | 0.2 | 0.3 |
| C1 |  | 0.1 | 0.1 | 0.2 | 0.0 | 0.2 |
| C2= |  | 0.0 | 0.0 | 0.0 | 0.0 | 0.0 |
| C2 |  | 0.2 | 0.2 | 0.4 | 0.1 | 0.3 |
| C3= |  | 0.1 | 0.0 | 0.0 | 0.0 | 0.0 |
| C3 |  | 5.4 | 3.6 | 5.8 | 1.2 | 4.0 |
| C4= |  | 0.0 | 0.0 | 0.0 | 0.0 | 0.0 |
| IC4 |  | 0.0 | 0.0 | 0.0 | 0.0 | 0.0 |
| C4 |  | 0.1 | 0.1 | 0.4 | 0.0 | 0.3 |
| C5= |  | 0.1 | 0.2 | 0.2 | 0.0 | 0.3 |
| IC5 |  | 0.0 | 0.0 | 0.0 | 0.0 | 0.0 |
| C5 |  | 0.1 | 0.2 | 0.4 | 0.0 | 0.3 |
| CO |  | 0.0 | 0.0 | 0.0 | 0.0 | 0.0 |
| C6 |  | 0.1 | 0.2 | 0.3 | 0.0 | 0.1 |
| H2O |  | 11.9 | 11.9 | 12.0 | 12.0 | 12.0 |
| % QAV | 150-300 | 12.5 | 15.1 | 16.0 | 14.2 | 15.6 |
| % diesel | 300-350 | 48.1 | 47.8 | 45.7 | 50.3 | 49.3 |
| % light oil | 350-450 | 6.3 | 7.5 | 11.4 | 7.9 | 13.0 |
| % heavy oil | 450+ | 14.6 | 12.6 | 6.9 | 14.2 | 4.3 |
| % Olefins QAV |  | 42.6 | 40.4 | 40.0 | 28.7 | 32.6 |
| % Nparaffin QAV |  | 57.5 | 59.6 | 60.0 | 71.3 | 67.4 |
| % Olefins diesel |  | 30.8 | 30.5 | 30.3 | 27.9 | 29.0 |
| % Nparaffin diesel |  | 69.7 | 70.0 | 70.3 | 72.6 | 71.7 |
| % Olefins light oil |  | 63.2 | 67.5 | 69.7 | 56.0 | 67.1 |
| % Nparaffin light oil |  | 36.8 | 32.5 | 30.3 | 44.1 | 32.9 |

Comparing the results of CAT3 (Table 5) with those obtained with CAT1 (Table 1) and CAT2 (Table 3), it can be seen that CAT3 is more selective for the production of renewable diesel and that it also does not show CO formation in the gas stream.

Example 4

Test with a composite bed formed of a first bed of CAT1 (Type 1) and a second downstream bed of CAT4 (Type 2). The CAT4 catalyst was prepared by impregnating ammonium heptamolybdate by the wet-spot technique on a 1.3 mm diameter cylindrical extruded support composed of 80% m gamma-alumina and 20% m beta zeolite and containing a nominal 20% m $MoO_3$ content. The material was dried at 120° C. for approximately 16 hours and calcined for 3 hours at 550° C. Under these conditions the molybdenum is preferentially in the oxidation state (+6), in the form of molybdenum trioxide or equivalent structures.

The reactor was loaded with CAT1 and CAT4 catalysts, so that the reactant flow passes first through CAT1 and then through CAT4, and had the temperature raised to 400° C., with hydrogen flow, for partial reduction of the metal oxide. According to the programmed temperature reduction (TPR) characterization analysis, a partially reduced molybdenum oxide based catalyst with a reduction degree between 1 and 90%, preferably between 5 and 50%, is obtained in this condition. After the temperature was reduced to the test condition, the load was injected.

A loading composed of 75% m n-heptane and 25% m soybean oil was used. The results of the tests are shown in Table 6.

TABLE 6

|  |  | T1 | T2 |
|---|---|---|---|
| Pressure | MPa | 60 | 60 |
| Temp. | ° C. | 340 | 350 |
| H2 load | Nm³/m³ | 600 | 600 |
| WHSV | h⁻¹ | 1.5 | 1.5 |
| % weight |  |  |  |
| CO2 |  | 1.1 | 1.1 |
| C1 |  | 0.1 | 0.1 |
| C2= |  | 0.1 | 0.0 |
| C2 |  | 0.3 | 0.3 |
| C3= |  | 1.9 | 1.3 |
| C3 |  | 2.3 | 3.0 |
| C4= |  | 0.2 | 0.6 |
| IC4 |  | 0.4 | 1.2 |
| C4 |  | 0.2 | 0.4 |
| C5= |  | 0.2 | 0.5 |
| IC5 |  | 0.0 | 0.0 |
| C5 |  | 0.2 | 0.2 |
| CO |  | 0.0 | 0.0 |
| C6 |  | 0.2 | 0.1 |
| H2O |  | 11.3 | 11.3 |
| % QAV | 150-300 | 18.8 | 33.8 |
| % diesel | 300-350 | 34.5 | 30.7 |
| % light oil | 350-450 | 12.5 | 12.3 |
| % heavy oil | 450+ | 15.7 | 3.1 |
| % Olefins + iso QAV |  | 82.1 | 88.4 |
| % Nparaffin QAV |  | 17.9 | 11.6 |
| % Olefins + iso diesel |  | 74.4 | 65.1 |
| % Nparaffin diesel |  | 25.9 | 35.1 |
| % Olefins oil |  | 91.1 | 86.8 |
| % Nparaffin + iso oil |  | 8.9 | 13.2 |

Comparing the results of Table 6 with the results of Table 1, it can be seen that the introduction of the Type 2 catalyst increases the conversion, decreasing the heavy oil yield and increasing the QAV yield, more markedly with increasing temperature. It also increases the selectivity for olefinic compounds, without changing the selectivity for gaseous compounds. As in the previous examples, no CO formation was observed in the gaseous products.

Example 5

Bed test formed of a first bed of CAT1 and a second downstream bed of CAT5. The CAT5 bimetallic catalyst was prepared by impregnating ammonium heptamolybdate and nickel nitrate by the wet-spot technique on 1.3 mm diameter cylindrical extruded support, composed of 80% m gamma-alumina and 20% m beta zeolite and containing a nominal 24% m $MoO_3$ and 4.7% NiO content. The material was dried at 120° C. for approximately 16 hours and calcined for 3 hours at 550° C. Under these conditions the molybdenum is preferentially in the oxidation state (+6), in the form of molybdenum trioxide or equivalent structures, and nickel is preferentially in the oxidation state (+2) as nickel oxide or equivalent structures.

The reactor was loaded with the catalysts so that the reactant flow passes first through CAT1 and then through CAT5, and had the temperature raised to 400° C., with hydrogen flow, for partial reduction of the metal oxide. According to the programmed temperature reduction (TPR) characterization analysis, a partially reduced molybdenum oxide based catalyst with a reduction degree between 1 and 90%, preferably between 5 and 50%, is obtained in this condition. After the temperature was reduced to the test condition, the load was injected.

A loading composed of 75% m n-heptane and 25% m soybean oil was used. The results of the tests are shown in Table 7.

TABLE 7

|  |  | T1 | T2 | T3 | T5 | T4 |
|---|---|---|---|---|---|---|
| Pressure | MPa | 60 | 60 | 60 | 60 | 60 |
| Temp. | ° C. | 360 | 350 | 340 | 330 | 320 |
| H2 load | Nm³/m³ | 600 | 600 | 600 | 600 | 600 |
| WHSV | h⁻¹ | 1.5 | 1.5 | 1.5 | 1.5 | 1.5 |
| % weight |  |  |  |  |  |  |
| CO2 |  | 0.7 | 0.9 | 0.7 | 0.8 | 1.1 |
| C1 |  | 0.7 | 0.6 | 0.3 | 0.1 | 0.1 |
| C2= |  | 0 | 0 | 0 | 0 | 0 |
| C2 |  | 0.4 | 0.3 | 0.2 | 0.2 | 0.1 |
| C3= |  | 0.1 | 0.2 | 0.1 | 0.4 | 0.4 |
| C3 |  | 11.1 | 5.8 | 4.4 | 2.6 | 2.9 |
| C4= |  | 0.3 | 0.4 | 0.3 | 0.1 | 0.1 |
| IC4 |  | 14.0 | 5.5 | 3.5 | 0.0 | 0.1 |
| C4 |  | 3.9 | 1.8 | 1.2 | 0.1 | 0.1 |
| C5= |  | 0.8 | 0.8 | 0.5 | 0.2 | 0.2 |
| IC5 |  | 0.1 | 0.0 | 2.0 | 0.0 | 0.1 |
| C5 |  | 3.1 | 1.3 | 0.9 | 0.1 | 0.1 |
| CO |  | 0.0 | 0.0 | 0.0 | 0.0 | 0.0 |
| C6 |  | 2.5 | 1 | 0.5 | 0.1 | 0.1 |
| H2O |  | 11.6 | 11.4 | 11.6 | 11.5 | 11.3 |
| % QAV + gasoline | 150-300 | 30.4 | 36.2 | 40.6 | 18.3 | 17.2 |
| % diesel | 300-350 | 13.5 | 33.9 | 33.2 | 36.7 | 34.5 |
| % light oil | 350-450 | 6.8 | 0.0 | 0.0 | 13.1 | 11.5 |
| % heavy oil | 450+ | 0.0 | 0.0 | 0.0 | 15.7 | 20.1 |
| % QAV olef + iso |  | 85.7 | 85.1 | 84.9 | 78.5 | 71.9 |
| "QAV par |  | 14.4 | 15.0 | 15.1 | 21.5 | 28.2 |
| % diesel olef + iso |  | 59.8 | 57.4 | 53.9 | 61.3 | 61.3 |
| % diesel par. |  | 40.3 | 43.1 | 46.5 | 39.2 | 39.1 |
| % oleo olef + iso |  | 90.4 | 88.4 | 87.5 | 87.7 | 87.8 |
| % olef par. |  | 9.6 | 11.7 | 12.5 | 12.3 | 12.3 |

Comparing Table 7 with Table 6 shows that CAT5 shows higher cracking and hydrogenation activity, which is responsible for the low yield of heavy oils and olefinic compounds, but shows high activity for isomerization reactions with the generation of branched and aromatic paraffinic compounds.

Table 8 is the two-dimensional chromatography analysis of the average liquid product formed in the various tests performed in example 5.

TABLE 8

|  | % m |
|---|---|
| Saturated | 86.3 |
| Olefins | 4.2 |
| Monoaromatics | 8.4 |
| Diaromatics | 1 |
| Polyaromatics | 0 |
| Aromatics total | 9.4 |

Analysis of Table 8 confirms the low concentration of olefinic compounds and a significant concentration of monoaromatic compounds, which is one of the significant products of this technology.

Table 9 presents the compositional analysis (PIANIO chromatography) of the C4 to C7 cut, obtained from the average product formed in the tests performed in example 5, which corresponds to the gasoline fraction produced.

TABLE 9

| TOTAL GROUPS |  | C4-C7 (% m) |
|---|---|---|
| PARAFFINS | NORMAL | 35.9 |
|  | 1 BRANCH | 48.3 |
|  | + OF 1 BRANCH | 2.2 |

TABLE 9-continued

| TOTAL GROUPS | | C4-C7 (% m) |
|---|---|---|
| OLEFINS | NORMAL | 3.4 |
| | 1 BRANCH | 4.8 |
| | + OF 1 BRANCH | 0.4 |
| NAPHTHENICS | PARAFFINICS | 3.1 |
| | OLEFINICS | 1.6 |
| AROMATICS | | 0.3 |
| OCTANE | | |
| | MON | 66.1 |
| | RON | 68.5 |

Table 9 shows a gasoline with octane rating suitable to be added to the current pool of a typical oil refinery, this octane rating is due to the presence of olefinic and branched compounds that are characteristic of this proposed process and are also an innovation.

Example 6

For better proof of the advantages obtained with the new process, an experiment was performed in a pilot unit, which presents performance equivalent to an industrial unit, configured in a process scheme compatible with the scheme presented in FIG. 1, with product recycle to dilute the load. In reactor 1, 160 ml of CAT1 catalyst was loaded, and in reactor 2, 40 ml of CAT5 catalyst was loaded. The activation procedure was identical to that employed in example 5. The results are shown in table 10.

TABLE 10

| | | T1 | T2 | T3 | T4 |
|---|---|---|---|---|---|
| Load | | Oleo de soja | Oleo de soja | Gordura | Gordura |
| Pressure | MPa | 60 | 60 | 60 | 60 |
| Temp. | ° C. | 350 | 355 | 330 | 330 |
| H2 load | Nm³/m³ | 607 | 600 | 562 | 601 |
| WHSV | h$^{-1}$ | 1.5 | 0.8 | 1.5 | 1.5 |
| % weight | | | | | |
| CO2 | | 0.86 | 1.15 | 0.43 | 0.52 |
| C1 | | 0.20 | 0.27 | 0.09 | 0.08 |
| C2= | | 0.02 | 0.02 | 0.00 | 0.02 |
| C2 | | 0.23 | 0.37 | 0.33 | 0.28 |
| C3= | | 0.76 | 0.70 | 0.79 | 0.82 |
| C3 | | 2.38 | 3.77 | 3.85 | 3.37 |
| C4= | | 0.03 | 0.08 | 0.00 | 0.00 |
| IC4 | | 0.01 | 0.09 | 0.00 | 0.00 |
| C4 | | 0.09 | 0.25 | 0.03 | 0.01 |
| C5= | | 0.00 | 0.00 | 0.00 | 0.00 |
| IC5 | | 0.15 | 0.05 | 0.00 | 0.00 |
| C5 | | 0.09 | 0.38 | 0.06 | 0.03 |
| CO | | 0.00 | 0.00 | 0.00 | 0.00 |
| C6 | | 0.65 | 1.50 | 0.20 | 0.41 |
| H2O | | 0.35 | 0.47 | 0.17 | 0.21 |
| % QAV | 150-300 | 14.10 | 20.00 | 31.00 | 29.10 |
| % diesel | 300-350 | 33.90 | 47.30 | 49.90 | 44.0 |
| % light oil | 350-450 | 13.20 | 6.40 | 2.80 | 4.70 |
| % heavy oil | 450+ | 33.00 | 17.30 | 10.30 | 16.00 |
| % Olefins + IsoP QAV | | 81.80 | 68.20 | 34.40 | 37.20 |
| % Nparaffin QAV | | 18.20 | 31.80 | 65.60 | 62.80 |
| % Oils + IsoP diesel | | 63.60 | 51.10 | 22.10 | 33.10 |
| % Nparaffin diesel | | 36.40 | 48.90 | 77.90 | 66.90 |

Two types of triacylglyceride fillers were used: soybean oil and animal fat, which showed quite distinct product profiles, with the fat filler being more selective for QAV and diesel production, while the more unsaturated oil (soybean oil) is more selective for heavier stream production. It was also possible to identify large amounts of branched paraffinic products along with the normal olefinic and paraffinic compounds, in addition to the presence of aromatic compounds.

The invention claimed is:
1. A method to produce renewable fuels and paraffinic distillates, the method comprising:
receiving a renewable selected from plant oils, animal fats, residual edible oils or acids;
receiving a process load comprising a mixture of a renewable stream, in the range of 1 to 75% by weight, and a fossil hydrocarbon stream, in the range of 99 to 25% by weight;
receiving a composite load stream diluted with a recycle of a liquid stream from a first separator vessel so that a volumetric dilution ratio is 2 to 10 diluent/load; and
performing a hydroconversion of the composite load stream is carried out in one or more reactors, in a presence of hydrogen, without injection of a sulfidizing agent, wherein the hydroconversion is carried out in two stages, hydrodeoxygenation/polymerization and hydrocracking, and in a presence of two distinct types of catalysts, Type 1 and Type 2, partially reduced,
wherein the Type 1 catalyst is used within the hydrodeoxygenation/polymerization stage, the Type 1 catalyst comprising metal oxides of the VIB group, partially reduced in a hydrogen atmosphere, and supported on materials with a sufficiently high specific area and a sufficiently low acidity for the hydrodeoxygenation/polymerization stage to function,
wherein an operating condition of the hydrodeoxygenation/polymerization stage being: pressure from 4 to 10 MPa, average catalytic bed temperatures between 320 and 400° C., space velocity between 0.5 to 2 h$^{-1}$ and a H$_2$:load ratio from 200 to 1000 NL of H$_2$/liter of load of the composite load stream,
wherein the Type 2 catalyst is used within the hydrocracking stage, the Type 2 catalyst comprising metal oxides from the VIB group and from the VIIIB group, partially reduced, and supported on materials with a sufficiently high specific area of a sufficiently high acidity for the hydrocracking stage to function, and
wherein an operating condition of the hydrocracking stage being: pressure from 4 to 10 MPa, average catalyst bed temperatures between 320 and 400° C., space velocity between 0.5 to 2 h$^{-1}$ and H$_2$:load ratio from 200 to 1000 NL of H$_2$/liter of load of the composite load stream.
2. The method according to claim 1, further comprising:
mixing the composite load stream with a stream of recycled product from the first separator vessel and an injection of recycle gas, rich in hydrogen;
heating a fraction of the composite load stream and recycle gas and directing the fraction to an inlet of a hydrotreating reactor;
directing an unheated fraction of the composite load, stream and recycle gas to a region between catalytic beds of the hydrotreating reactor, for reactor temperature control;
directing an effluent from the hydrotreating reactor to the first separator vessel where an aqueous phase, a gaseous phase comprising light hydrocarbons, and a liquid phase are separated;
returning a first fraction of the liquid phase from the first separator to the beginning of the process to dilute the composite load stream;
mixing a second fraction of the liquid phase from the first separator with replacement hydrogen and directing a resulting mixture to a hydrocracking reactor, located downstream of the hydrotreating reactor;
sending effluent from the hydrocracking reactor to a second separator vessel, from where a H$_2$-rich gas stream is recycled directly to the hydrotreating reactor, with no need for treatment in amine units to remove contaminants; and directing a liquid stream from the second separator vessel to a distillation tower where a lighter stream, rich in olefins with 3 to 4 carbon atoms; a gasoline stream, rich in isomers and olefins; a stream with a QAV distillation range, containing olefins and aromatics; a renewable diesel stream and a stream heavier than diesel are separated.

3. The method according to claim 2, wherein the catalytic beds of the hydrotreating reactor comprise the Type 1 catalyst and catalytic beds of the hydrocracking reactor comprise the Type 2 catalyst.

4. The method according to claim 3, wherein the Type 1 catalyst comprises a γ-alumina catalyst support (γ-$AlO_3$), with specific area between 200 and 400 $m^2$/g and pore volume of 0.5 to 1.0 $cm^3$/g.

5. The method according to claim 3, wherein the Type 2 catalyst support is zeolite type molecular sieves.

6. The method according to claim 5, wherein the zeolite type molecular sieves comprise Beta zeolite, ZSM-22 or Y zeolite.

7. A fuel produced according to the method of claim 2, wherein the gasoline stream contains olefinic compounds in concentration in the range of 3 to 10% and branched paraffinic compounds in concentration in the range of 50 to 70%, resulting in an octane rating in the range of 50 to 70.

8. A fuel produced according to the method of claim 2, wherein the QAV distillation range has a Freezing Point between −5° C. and −20° C., and can be incorporated into the load of fossil QAV MDT units, meeting limits established by the norm ASTM 1655.

9. A fuel produced according to the method of claim 2, wherein the renewable diesel stream has a cetane number between 55 and 75.

10. The method according to claim 2, wherein the method is carried out in a single reactor containing catalyst beds of Type 1 and Type 2 catalysts.

11. The method according to claim 1, wherein the plant oil is selected from the group consisting of: castor, soybean, canola, peanut, palm (palm oil) and babassu oil, pure or mixed in any proportion.

12. The method according to claim 1, wherein the renewable filler is animal fat of any origin.

13. The method according to claim 1, wherein the renewable filler is a mixture of plant oil and animal fat in any proportion.

14. The method according to claim 1, wherein the Type 1 catalyst is active for hydrodeoxygenation and polymerization reactions, the Type 1 catalyst comprising metal oxides of groups VIB and VIIIB, supported on materials with sufficiently high specific area, sufficiently low acidity, and sufficiently high porosity for the hydrodeoxygenation and polymerization reactions to occur, and wherein the metal oxides are partially reduced in the presence of hydrogen at a process temperature and pressure that occurs during the hydrodeoxygenation and polymerization reactions, and wherein the Type 2 catalyst is active for hydrocracking reactions, the Type 2 catalyst comprising metal oxides of the VIB and VIIIB group, deposited on a support with acidic properties and are partially reduced in the presence of hydrogen at the process temperature and pressure that occurs during the hydrocracking reaction.

15. The method according to claim 1, therein the volumetric dilution ratio is 3 to 6 diluent/load of the composite load stream.

16. The method according to claim 1, wherein the Type 1 catalyst comprises $MoO_3$ or $WO_3$.

17. The method according to claim 1, wherein the Type 1 catalyst is supported by alumina range, silica, $TiO_2$, or $ZrO_2$.

18. The method according to claim 1, wherein the Type 2 catalyst comprises metal oxides of Ni—Mo, Co—Mo, Co—W or Ni—W.

* * * * *